United States Patent
Andersen et al.

(10) Patent No.: US 10,105,692 B2
(45) Date of Patent: Oct. 23, 2018

(54) ZONED AMMONIA SLIP CATALYST FOR USE IN COMBUSTION TURBINES

(71) Applicant: Johnson Matthey Public Limited Company, London (GB)

(72) Inventors: Paul Joseph Andersen, Audubon, PA (US); Kevin Doura, Audubon, PA (US)

(73) Assignee: Johnson Matthey Public Limited Company, London (GB)

(*) Notice: Subject to any disclaimer, the term of this patent is extended or adjusted under 35 U.S.C. 154(b) by 0 days.

(21) Appl. No.: 15/279,661

(22) Filed: Sep. 29, 2016

(65) Prior Publication Data

US 2017/0087541 A1    Mar. 30, 2017

Related U.S. Application Data

(60) Provisional application No. 62/234,116, filed on Sep. 29, 2015.

(51) Int. Cl.
*B01D 53/86* (2006.01)
*B01D 53/94* (2006.01)
(Continued)

(52) U.S. Cl.
CPC .......... *B01J 29/763* (2013.01); *B01D 53/865* (2013.01); *B01D 53/8628* (2013.01); *B01D 53/8634* (2013.01); *B01D 53/9418* (2013.01); *B01D 53/9436* (2013.01); *B01D 53/9468* (2013.01); *B01D 53/9472* (2013.01); *B01J 21/04* (2013.01); *B01J 23/30* (2013.01); *B01J 23/42* (2013.01); *B01J 35/0006* (2013.01); *B01J 35/02* (2013.01); *F01N 3/106* (2013.01);
(Continued)

(58) Field of Classification Search
CPC . B01J 21/04; B01J 21/066; B01J 23/30; B01J 23/40; B01J 23/42; B01J 23/44; B01J 23/46; B01J 23/54; B01J 23/63; B01J 29/763; B01J 35/0006; B01J 35/02; B01J 35/04; B01D 53/8628; B01D 53/8634; B01D 53/865; B01D 53/9418; B01D 53/9436; B01D 53/9468; B01D 53/9472; F01N 3/106; F01N 3/2066
See application file for complete search history.

(56) References Cited

U.S. PATENT DOCUMENTS

| 4,010,238 A | 3/1977 | Shiraishi et al. |
| 4,085,193 A | 4/1978 | Nakajima et al. |

(Continued)

FOREIGN PATENT DOCUMENTS

| DE | 102012005508 A1 | 9/2013 |
| EP | 1961933 A1 | 8/2008 |
| JP | 2014061456 A | 4/2014 |

*Primary Examiner* — Cam N. Nguyen

(57) ABSTRACT

A catalytic article for treating an exhaust gas stream containing one or more of NOx, hydrocarbons, CO, SOx and ammonia from a combustion turbine comprises (a) a substrate having an inlet end and an outlet end defining an axial length; (b) an oxidation layer comprising an oxidation catalyst comprising one or more noble metals, the oxidation layer being positioned on the substrate and covering the axial length of the substrate; and (c) an SCR layer comprising an SCR catalyst, the SCR layer being positioned on the oxidation layer and overlapping a portion of the oxidation layer, wherein the portion is less than 100%.

20 Claims, 1 Drawing Sheet

(51) Int. Cl.

| | | |
|---|---|---|
| *F01N 3/10* | (2006.01) | |
| *F01N 3/20* | (2006.01) | |
| *B01J 21/04* | (2006.01) | |
| *B01J 21/06* | (2006.01) | |
| *B01J 23/30* | (2006.01) | |
| *B01J 23/40* | (2006.01) | |
| *B01J 23/42* | (2006.01) | |
| *B01J 23/44* | (2006.01) | |
| *B01J 23/46* | (2006.01) | |
| *B01J 23/54* | (2006.01) | |
| *B01J 23/63* | (2006.01) | |
| *B01J 29/76* | (2006.01) | |
| *B01J 35/00* | (2006.01) | |
| *B01J 35/02* | (2006.01) | |
| *B01J 35/04* | (2006.01) | |

(52) U.S. Cl.
CPC .... *F01N 3/2066* (2013.01); *B01D 2255/1021* (2013.01); *B01D 2255/40* (2013.01); *B01D 2255/50* (2013.01); *B01D 2255/903* (2013.01); *B01D 2255/904* (2013.01); *B01D 2255/9022* (2013.01); *B01D 2255/9025* (2013.01); *F01N 2510/0682* (2013.01); *F01N 2570/18* (2013.01); *F01N 2610/02* (2013.01); *Y02T 10/24* (2013.01)

(56) References Cited

U.S. PATENT DOCUMENTS

| | | | |
|---|---|---|---|
| 7,393,511 B2 | 7/2008 | Tran et al. | |
| 7,410,626 B2 | 8/2008 | Tran et al. | |
| 8,202,481 B2 | 6/2012 | Nochi et al. | |
| 8,246,922 B2* | 8/2012 | Boorse | B01D 53/9445 422/170 |
| 8,252,258 B2* | 8/2012 | Muller-Stach | B01D 53/944 423/213.2 |
| 8,293,182 B2* | 10/2012 | Boorse | B01D 53/9468 422/180 |
| 8,449,852 B1* | 5/2013 | Sung | B01J 23/62 423/213.5 |
| 8,568,674 B1* | 10/2013 | Sung | B01J 37/0244 423/213.2 |
| 8,679,434 B1* | 3/2014 | Li | B01J 23/42 423/213.5 |
| 8,858,904 B2* | 10/2014 | Punke | B01J 37/0248 422/177 |
| 9,333,490 B2* | 5/2016 | Kazi | B01J 23/44 |
| 9,440,192 B2* | 9/2016 | Hoke | B01D 53/945 |
| 9,545,602 B2* | 1/2017 | Sonntag | B01J 35/0006 |
| 9,579,603 B2* | 2/2017 | Sonntag | B01J 35/0006 |
| 9,597,636 B2* | 3/2017 | Sonntag | B01J 35/0006 |
| 9,597,661 B2* | 3/2017 | Blakeman | B01J 35/0006 |
| 9,649,596 B2* | 5/2017 | Chang | B01D 53/9418 |
| 9,707,542 B2* | 7/2017 | Bergeal | B01J 37/0244 |
| 9,751,080 B2* | 9/2017 | Fedeyko | B01J 29/74 |
| 9,757,718 B2* | 9/2017 | Fedeyko | B01J 29/763 |
| 9,789,441 B2* | 10/2017 | Larsson | B01J 23/8472 |
| 9,849,421 B2* | 12/2017 | Chandler | B01J 35/04 |
| 9,868,115 B2* | 1/2018 | Sumiya | B01J 29/763 |
| 9,937,489 B2* | 4/2018 | Larsson | B01J 29/763 |
| 2014/0274665 A1* | 9/2014 | Vaarkamp | B01J 23/22 502/74 |
| 2015/0037233 A1 | 2/2015 | Fedeyko | |

* cited by examiner

ZONED AMMONIA SLIP CATALYST FOR USE IN COMBUSTION TURBINES

CROSS-REFERENCE TO RELATED APPLICATIONS

This application claims priority benefit of U.S. Provisional Patent Application No. 62/234,116, filed Sep. 29, 2015, the disclosures of which are incorporated herein by reference in their entireties for all purposes.

FIELD OF THE INVENTION

The invention relates to articles containing ammonia slip catalysts (ASC) and CO oxidation catalysts (Oxicats) and methods of manufacturing and using such articles to control ammonia and CO emissions from combustion turbine exhausts.

BACKGROUND OF THE INVENTION

Combustion of hydrocarbon-based fuel in electrical power stations and in engines produces exhaust gas that contains, in large part, relatively benign nitrogen ($N_2$), water vapour ($H_2O$), and carbon dioxide ($CO_2$). But the exhaust gases also contain, in relatively small part, noxious and/or toxic substances, such as carbon monoxide (CO) from incomplete combustion, hydrocarbons (HC) from un-burnt fuel, nitrogen oxides ($NO_x$) from excessive combustion temperatures, and particulate matter (mostly soot). To mitigate the environmental impact of exhaust gas released into the atmosphere, it is desirable to eliminate or reduce the amount of the undesirable components, preferably by a process that, in turn, does not generate other noxious or toxic substances.

Typically, exhaust gases from electrical power stations and lean burn engines have a net oxidizing effect due to the high proportion of oxygen that is provided to ensure adequate combustion of the hydrocarbon fuel. In such gases, one of the most burdensome components to remove is $NO_x$, which includes nitric oxide (NO) and nitrogen dioxide ($NO_2$). The reduction of $NO_x$ to $N_2$ is particularly problematic because the exhaust gas contains enough oxygen to favour oxidative reactions rather than reduction. Notwithstanding, $NO_x$ can be reduced by a process commonly known as Selective Catalytic Reduction (SCR). The SCR process involves the conversion of $NO_x$, in the presence of a catalyst and with the aid of a nitrogenous reducing agent, such as ammonia, into elemental nitrogen ($N_2$) and water. In a SCR process, a gaseous reductant such as ammonia is added to an exhaust gas stream prior to contacting the exhaust gas with the SCR catalyst. The reductant is absorbed onto the catalyst and the NO reduction reaction takes place as the gases pass through or over the catalysed substrate. The chemical equations for SCR with ammonia are:

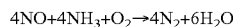

$$4NO+4NH_3+O_2 \rightarrow 4N_2+6H_2O$$

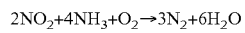

$$2NO_2+4NH_3+O_2 \rightarrow 3N_2+6H_2O$$

$$NO+NO_2+2NH_3 \rightarrow 2N_2+3H_2O$$

Some ammonia may pass through the SCR catalyst without reacting (also referred to as "ammonia slip") and this is undesirable, because the released ammonia gas can negatively impact the atmosphere and can react with other combustion species. To reduce ammonia slip, SCR systems can include an ammonia oxidation catalyst (AMOX) (also known as an ammonia slip catalyst (ASC)) downstream of the SCR catalyst.

Catalysts for oxidizing excess ammonia in an exhaust gas are known. For example, U.S. Pat. No. 7,393,511 describes an ammonia oxidation catalyst containing a precious metal, such as platinum, palladium, rhodium, or gold on a support of titania alumina, silica, zirconia, etc. Other ammonia oxidation catalysts contain a first layer of vanadium oxide, tungsten oxide, and molybdenum oxide on a titania support, and a second layer of platinum on a titania support (see, e.g., U.S. Pat. Nos. 8,202,481 and 7,410,626).

Current ASC technology uses a combination of an oxidation function and a SCR function to selectively convert $NH_3$ to $N_2$. In gas turbine applications, the primary function of an ASC is to control $NH_3$ slip. However, as an ASC has an oxidation function, the ASC could also replace upstream oxidation catalysts that are used to oxidize volatile organic carbons (VOC's) and carbon monoxide (CO) resulting in a SCR-ASC catalyst system which is simpler and potentially lower cost.

Due to stricter emissions requirements, gas turbines are now typically being required to emit less than 5 ppm CO, which can require 90% or higher CO conversion. The CO conversion provided by the ASC may not be sufficient to meet the required system performance targets. Thus in many cases it is desirable to add an additional CO oxidation function to the SCR-ASC system. However since the ASC is already catalysing significant CO oxidation, the additional CO oxidation capability required is small. This system would have a (using an upstream to downstream notation) SCR-ASC-CO Oxidation catalyst configuration.

Since only a relatively small amount of CO oxidation capability may be required in the SCR-ASC-CO Oxidation catalyst system, the CO oxidation catalyst may have a relatively small depth. This can present a problem in the manufacturing and packaging of the catalyst. It is the purpose of this invention to address this manufacturing and packaging problem.

SUMMARY OF THE INVENTION

A two-layer ASC is known to those in the art to selectively oxidize $NH_3$ to $N_2$. A two-layer ASC consists of a substrate (for example a cordierite honeycomb monolith) coated with a layer of oxidation catalyst, designated as the bottom layer. An additional layer comprising an SCR catalyst is coated over the bottom layer (i.e. the top layer). The bottom layer of this catalyst is similar in formulation and construction to the oxidation catalysts typically used in combustion exhausts and can effectively perform that oxidation function.

As mentioned above, for a SCR-ASC-Oxidation Catalyst system in a gas turbine where CO oxidation performance is required in excess of that provided by the ASC alone, the required oxidation catalyst length can be quite short, possibly 25 mm or less. Preparing a catalyst with such a short length and mounting this short catalyst in an appropriate housing can be extremely challenging. A longer catalyst may be used but this would be a less economical solution and would have higher pressure drop, both significant disadvantages.

One approach to preparing an ASC-CO oxidation formulation is to coat a single inert substrate (for example, a cordierite honeycomb) with an oxidation catalyst layer (the bottom layer) continuously from the substrate inlet to the substrate outlet and then partially cover the bottom layer by a layer comprising an SCR catalyst (the top layer). This would leave a relatively short bottom layer zone in the rear of the substrate to act as a CO oxidation catalyst. By coating both the ASC and CO Oxidation catalyst on a single, longer substrate, manufacturing and catalyst packaging issues would be avoided.

In the first aspect, the invention relates to catalytic article for treating an exhaust gas stream containing one or more of NOx, hydrocarbons, CO, SOx and ammonia from a combustion turbine, which catalytic article comprising: (a) a substrate having an inlet end and an outlet end defining an axial length; (b) an oxidation layer comprising an oxidation catalyst comprising one or more noble metals, the oxidation layer being positioned on the substrate and covering the axial length of the substrate; and (c) an SCR layer comprising an SCR catalyst, the SCR layer being positioned on the oxidation layer and overlapping a portion of the oxidation layer, wherein the portion is less than 100%.

In a second aspect, the invention relates to an exhaust system comprising a catalytic article according to the first aspect of the invention.

In a third aspect, the invention relates to a combustion turbine comprising an exhaust system according to the third aspect of the invention.

In a fourth aspect, the invention relates to a method of increasing the conversion of CO and HC in an exhaust gas from a combustion turbine by contacting an exhaust gas comprising CO and HC with a catalytic article of the first aspect of the invention.

In a fifth aspect, the invention relates to a method of reducing ammonia slip in an exhaust gas of a combustion turbine, the method comprising contacting an exhaust gas comprising ammonia with a catalytic article according to the first aspect of the invention.

In a sixth aspect, the invention relates to a method of increasing the conversion of CO and HC and reducing ammonia slip in an exhaust gas of a combustion turbine, the method comprising contacting an exhaust gas comprising CO, HC and ammonia with a catalytic article according to the first aspect of the invention.

In a seventh aspect, the invention relates to a method of increasing the sulphur tolerance of a catalyst in an exhaust gas from a combustion turbine by contacting an exhaust gas comprising sulphur with a catalytic article of the first aspect of the invention, wherein the SCR layer extends from the outlet end toward the inlet end.

BRIEF DESCRIPTION OF THE DRAWINGS

In order that the invention may be more fully understood, embodiments of the invention will now be described with reference to the accompanying drawings, in which.

DETAILED DESCRIPTION OF THE INVENTION

Figure 1A:
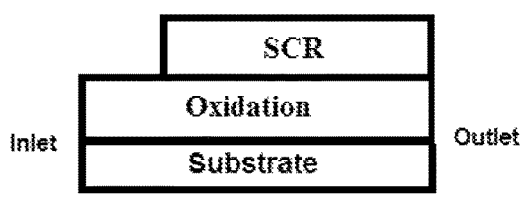
FIG. 1a shows a configuration in which a top layer comprising an SCR catalyst is located over a bottom layer comprising an oxidation catalyst, the top layer covers the bottom layer from the outlet end, and the inlet of the bottom layer is not covered by the top layer.

As used in this specification and the appended claims, the singular forms "a", "an" and "the" include plural referents unless the context clearly indicates otherwise. Thus, for example, reference to "a catalyst" includes a mixture of two or more catalysts, and the like.

The term "ammonia slip", means the amount of unreacted ammonia that passes through the SCR catalyst.

The term "axial length" means the distance between the inlet end and the outlet end of the substrate.

The term "support" means the material to which a catalyst is fixed.

The term "refractory metal oxide support" means a ceramic material containing a metal oxide that can be used at elevated temperatures.

The term "noble metals" means gold, silver, platinum, palladium, ruthenium, rhodium, osmium and iridium.

The term "calcine", or "calcination", means heating the material in air or oxygen. This definition is consistent with the IUPAC definition of calcination. (IUPAC. Compendium of Chemical Terminology, 2nd ed. (the "Gold Book"). Compiled by A. D. McNaught and A. Wilkinson. Blackwell Scientific Publications, Oxford (1997). XML on-line corrected version: http://goldbook.iupac.org (2006-) created by M. Nic, J. Jirat, B. Kosata; updates compiled by A. Jenkins. ISBN 0-9678550-9-8. doi:10.1351/goldbook.) Calcination is performed to decompose a metal salt and promote the exchange of metal ions within the catalyst and also to adhere the catalyst to a substrate. The temperatures used in calcination depend upon the components in the material to be calcined and generally are between about 400° C. to about 900° C. for approximately 1 to 8 hours. In some cases, calcination can be performed up to a temperature of about 1200° C. In applications involving the processes described herein, calcinations are generally performed at temperatures from about 400° C. to about 700° C. for approximately 1 to 8 hours, preferably at temperatures from about 400° C. to about 650° C. for approximately 1 to 4 hours.

The term "about" means approximately and refers to a range that is optionally ±25%, preferably ±10%, more preferably, ±5%, or most preferably ±1% of the value with which the term is associated.

When a range, or ranges, for various numerical elements are provided, the range, or ranges, can include the values, unless otherwise specified.

The term "continuous oxidation layer" means that the oxidation layer is predominantly without interruption and allows for the presence of occasional discontinuities.

In a first aspect of the invention, a catalytic article for treating an exhaust gas stream containing one or more of NOx, hydrocarbons, CO, SOx and ammonia from a combustion turbine comprises: (a) a substrate having an inlet end and an outlet end defining an axial length; (b) an oxidation layer comprising an oxidation catalyst comprising one or more noble metals, the oxidation layer being positioned on the substrate and covering the axial length of the substrate; and (c) an SCR layer comprising an SCR catalyst, the SCR layer being positioned on the oxidation layer and overlapping a portion of the oxidation layer, wherein the portion is less than 100%.

The SCR layer can be present in several configurations. The SCR layer can extend from the inlet end toward the outlet end. The SCR layer can extend from the outlet end toward the inlet end. The SCR layer can extend from a distance from the inlet end of the substrate towards the outlet end of the substrate and does not cover the inlet and outlet portions of the substrate. The SCR layer can extend from the inlet end toward the outlet end and from the outlet end towards the inlet end.

The catalytic article can provide higher CO/HC conversion than a comparable article where the second catalyst coating completely overlaps the first catalyst coating.

The catalytic article can provide reduced ammonia slip than a comparable article where the second catalyst coating completely overlaps the first catalyst coating.

The catalytic article can provide higher CO/HC conversion and reduced ammonia slip than a comparable article where the second catalyst coating completely overlaps the first catalyst coating.

The SCR layer can comprise a first SCR catalyst and a second SCR catalyst, wherein the first SCR catalyst is different from the second SCR catalyst and the first SCR catalyst is located on the inlet side of the article relative to the second SCR catalyst.

The first SCR catalyst and the second SCR catalyst can comprise different catalytic species. By different species is meant a chemically different catalyst. For example, the first SCR catalyst can be a base metal (such as vanadium) and the second SCR catalyst can be a metal containing molecular sieve (such as copper chabazite (Cu-CHA)), or the first SCR catalyst can be a metal containing molecular sieve (such as Cu-CHA) and the second SCR catalyst can be a different metal containing molecular sieve (such as iron-chabazite (Fe-CHA).

The oxidation layer can comprise a first oxidation catalyst and a second oxidation catalyst, where the first oxidation catalyst is different than the second oxidation catalyst and the first oxidation catalyst is located on the inlet side of the article relative to the second oxidation catalyst.

The first oxidation catalyst and the second oxidation catalyst can differ based on the loading of the oxidation catalyst. Preferably the loading of the oxidation catalyst is higher in the second oxidation catalyst than in the first oxidation catalyst.

The first oxidation catalyst and the second oxidation catalyst can comprise different catalytic species.

The first SCR catalyst and the second SCR catalyst can differ based on the loading of the SCR catalyst. Preferably, the loading of the SCR catalyst is higher over the second oxidation catalyst than over the first oxidation catalyst.

The catalytic article can further comprise a third catalyst coating, wherein the third catalyst coating extends from the outlet end toward the inlet end and the first catalyst coating contain an area that is not coated by the second catalyst coating or the third catalyst coating. The third catalyst coating can comprise an SCR catalyst that is different from the SCR catalyst in the second catalyst coating.

The SCR zone can extend over 95% or less, preferably over 90% or less, more preferably extends over 75% or less, even more preferably extends over 50% or less, of the axial length of the substrate.

Various configurations of the SCR catalyst and the oxidation catalyst in the catalyst article are shown in FIGS. 1-4.

Figure 1B:
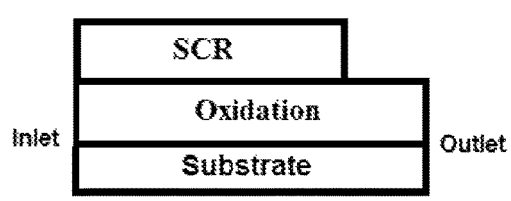
FIG. 1b shows a configuration in which a top layer comprising an SCR catalyst is located over a bottom layer comprising an oxidation catalyst, the top layer covers the bottom layer from the inlet end, and the outlet of the bottom layer is not covered by the top layer.
Figure 1C:
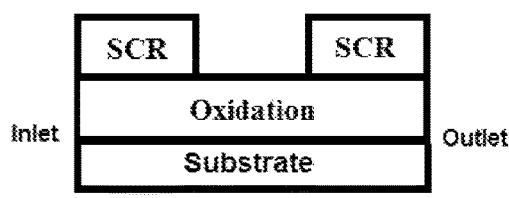
FIG. 1c shows a configuration in which there are two top layers, each comprising an SCR catalyst, located over a bottom layer comprising an oxidation catalyst, where one of the top layers is located at the inlet of the bottom layer, the second of the top layers is located at the outlet of the bottom layer and a portion of the bottom layer between the two top layers is not covered by a top layer.

FIGS. 1a-1c show configurations in which there is an oxidation catalyst in the bottom layer and an SCR catalyst in the top layer. In these configurations, the bottom layer can comprise one or more oxidation catalysts and the top layers can comprise one or more SCR catalysts. When more than one SCR catalyst or oxidation catalyst is present in the layer, the more than one SCR catalyst and/or the more than one oxidation catalyst, is present as a mixture.

Figure 2A:
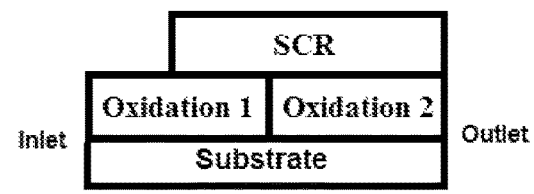
FIG. 2a shows a configuration in which a top layer comprising an SCR catalyst is located over a bottom layer comprising two adjacent oxidation catalysts, where a first oxidation catalyst is located at the inlet and the second oxidation catalyst is located at the outlet, and the inlet of the bottom layer is not covered by the top layer.
Figure 2B:
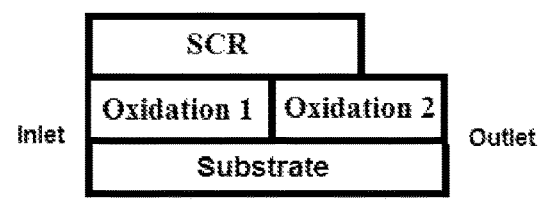
FIG. 2b shows a configuration in which a top layer comprising an SCR catalyst is located over a bottom layer comprising two adjacent oxidation catalysts, where a first oxidation catalyst is located at the inlet and a second oxidation catalyst is located on the outlet, and the outlet of the bottom layer is not covered by the top layer.
Figure 2C:
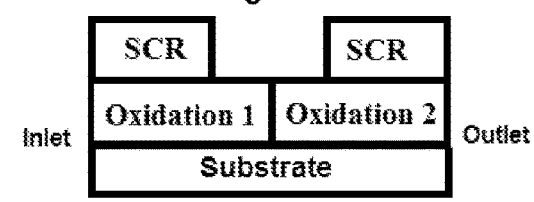
FIG. 2c shows a configuration in which there are two top layers, each comprising an SCR catalyst, located over a bottom layer comprising two adjacent oxidation catalysts, where a first oxidation catalyst is located at the inlet and a second oxidation catalyst is located at the outlet, where the inlet of the first oxidation catalyst and the outlet of the second oxidation catalyst are each covered by one of the top layers and a section of the bottom layer comprising a portion of the first oxidation catalyst and a portion of the second oxidation catalyst is not covered by the top layer.
Figure 3A:
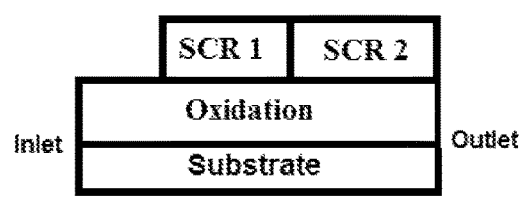
FIG. 3a shows a configuration in which there is a first top layer comprising a first SCR catalyst and a second top layer comprising a second SCR catalyst located over a bottom layer comprising an oxidation catalyst, where the second top layer is located at the outlet, the first top layer is located on the inlet side of the second top layer and a portion of the bottom layer at the inlet end is not covered by a top layer.
Figure 4A:
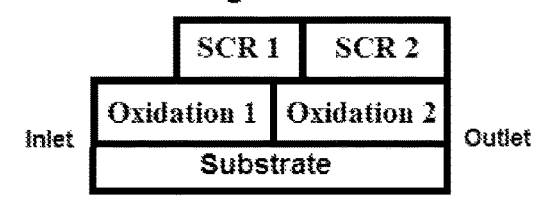
FIG. 4a shows a configuration in which there is a first top layer comprising a first SCR catalyst and a second top layer comprising a second SCR catalyst located over a bottom layer comprising a first oxidation catalyst and a second oxidation, where first oxidation catalyst is located at the inlet and the second oxidation catalyst is adjacent to the first oxidation catalyst and extends from the outlet, the second top layer is located at the outlet, the first top layer is located on the inlet side of the second top layer and a portion of the bottom layer at the inlet end is not covered by a top layer.
Figure 3B:
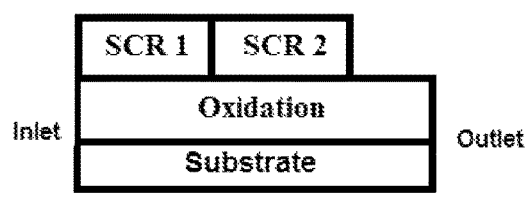
FIG. 3b shows a configuration in which there is a first top layer comprising a first SCR catalyst and a second top layer comprising a second SCR catalyst located over a bottom layer comprising an oxidation catalyst, where the first top layer is located at the inlet, the second top layer is located on the outlet side of the first top layer, and a portion of the bottom layer at the outlet end is not covered by a top layer.
Figure 4B:
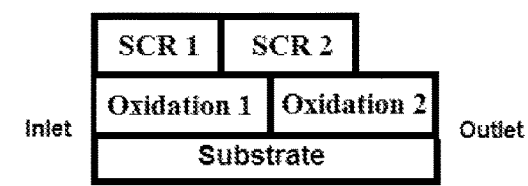
FIG. 4b shows a configuration in which there is a first top layer comprising a first SCR catalyst and a second top layer comprising a second SCR catalyst located over a bottom layer comprising an oxidation catalyst, where first oxidation catalyst is located at the inlet and the second oxidation catalyst is adjacent to the first oxidation catalyst and extends from the outlet, the first top layer is located at the inlet, the second top layer is located on the outlet side of the first top layer, and a portion of the bottom layer at the outlet end is not covered by a top layer.

When more than one catalyst is present in a layer and the catalysts are separated, the configurations are shown in FIGS. 2-4. FIGS. 2a-2c show configurations in which there are two oxidation catalysts in different portions of the bottom layer and an SCR catalyst in the top layer. FIGS. 3a and 3b show configurations in which there is an oxidation catalyst in the bottom layer and there are two SCR catalysts, each in a different portion of the top layer. FIGS. 4a and 4b show configurations in which there are two oxidation catalysts, each in a different portion of the bottom layer, and two SCR catalysts, each in a different portion of the top layer.

FIGS. 1a and 2a show configurations where the portion of the bottom layer not covered by the top layer is located at the inlet end of the substrate. FIGS. 1b and 2b show configurations where the portion of the bottom layer not covered by the top layer is located at the outlet end of the substrate. FIGS. 1c and 2c show configurations where the portion of the bottom layer not covered by the top layer is located between the two SCR catalysts.

FIG. 1a shows a configuration in which a top layer comprising an SCR catalyst is located over a bottom layer comprising an oxidation catalyst, the top layer covers the bottom layer from the outlet towards the inlet, and a portion of the bottom layer extending from the inlet is not covered by the top layer. A catalytic article of this configuration can be prepared by first forming a bottom layer by applying a washcoat comprising one or more oxidation catalysts over the axial length of the substrate. The washcoat can then be dried and preferably calcined before a top layer is applied over the bottom layer. A top layer can be formed by applying a washcoat comprising one or more SCR catalysts over the bottom layer comprising the oxidation catalyst from the outlet toward the inlet, but not covering a portion extending from the inlet. The catalyst article can then be dried and calcined.

FIG. 1b shows a configuration in which a top layer comprising an SCR catalyst is located over a bottom layer comprising an oxidation catalyst, the top layer covers the bottom layer from in inlet end, and a portion of the bottom layer extending from the outlet is not covered by the top layer. A catalytic article of this configuration can be prepared by first forming a bottom layer by applying a washcoat comprising one or more oxidation catalysts over the axial length of the substrate. The washcoat can then be dried and preferably calcined before a top layer is applied over the bottom layer. A top layer can be formed by applying a washcoat comprising one or more SCR catalysts over the bottom layer comprising the oxidation catalyst from the inlet toward the outlet, but not covering a portion extending from the outlet.

FIG. 1c shows a configuration in which there are two top layers, each comprising an SCR catalyst, located over a bottom layer comprising an oxidation catalyst, where one of the top layers is located at the inlet of the bottom layer, the second of the top layers is located at the outlet of the bottom layer and a portion of the bottom layer between the two top layers is not covered by a top layer. A catalytic article of this configuration can be prepared by forming a bottom layer by applying a washcoat comprising one or more oxidation catalysts over the axial length of the substrate. The washcoat can then be dried and preferably calcined. A top layer can be formed by applying a washcoat comprising one or more SCR catalysts over the bottom layer comprising the oxidation catalyst from the inlet end and from the outlet end, where the two SCR layers have a space between them and the oxidation layer is not completely coated by the two SCR layers. The catalyst article can then be dried and calcined.

FIG. 2a shows a configuration in which a top layer comprising an SCR catalyst is located over a bottom layer comprising two adjacent oxidation catalysts, where a first oxidation catalyst (Oxidation 1) is located at the inlet and the second oxidation catalyst (Oxidation 2) is located at the outlet, and a portion of the bottom layer extending from the inlet is not covered by the top layer. A catalytic article of this configuration can be prepared by first forming a bottom layer by applying a first washcoat comprising one or more oxidation catalysts from either the inlet side or the outlet side over a portion, but not all, of the axial length of the substrate. This layer can optionally be dried, and then a second washcoat comprising at least one different oxidation catalyst can be applied from the end of the substrate that the first washcoat was not applied. In FIG. 2a, the first washcoat (Oxidation 1) was applied from the inlet sides of the substrate and then the second washcoat (Oxidation 2) was applied from the outlet of the substrate. The labels would be reversed where the first washcoat to be applied from the outlet side of the substrate. (Not shown in the figures) This also applies to the labelling of the oxidation catalysts in FIGS. 2b, 2c, 4a and 4b and the SCR catalysts in FIGS. 3a, 3b, 4a and 4b. The bottom layer washcoat(s) can then be dried and preferably calcined before a top layer is applied over the bottom layer. A top layer can be formed by applying a washcoat comprising one or more SCR catalysts over the layer comprising the oxidation catalyst from the outlet end. The catalyst article can then be dried and calcined.

FIG. 2b shows a configuration in which a top layer comprising an SCR catalyst is located over a bottom layer comprising two adjacent oxidation catalysts, where a first oxidation catalyst (Oxidation 1 is located at the inlet and a second oxidation catalyst (Oxidation 2) is located on the outlet, and a portion of the bottom layer extending from the outlet is not covered by the top layer. A catalytic article of this configuration can be prepared by first forming a bottom layer by applying a first washcoat comprising one or more oxidation catalysts from either the inlet side or the outlet side over a portion, but not all, of the axial length of the substrate. This layer can optionally be dried. A second washcoat comprising at least one different oxidation catalyst can be applied from the end of the substrate that the first washcoat was not applied. The bottom layer washcoat(s) can then be dried and preferably calcined before a top layer is applied over the bottom layer. A top layer can be formed by applying a washcoat comprising one or more SCR catalysts over the bottom layer comprising the oxidation catalyst from the inlet toward the outlet, but not covering a portion extending from the outlet. The catalyst article can then be dried and calcined.

FIG. 2c shows a configuration in which there are two top layers, each comprising an SCR catalyst, located over a bottom layer comprising two adjacent oxidation catalysts, where a first oxidation catalyst (Oxidation 1) is located at the inlet and a second oxidation catalyst (Oxidation 2) is located at the outlet, where the inlet of the first oxidation catalyst and the outlet of the second oxidation catalyst are each covered by one of the top layers and a section of the bottom layer comprising a portion of the first oxidation catalyst and a portion of the second oxidation catalyst is not covered by the top layer. A catalytic article of this configuration can be prepared by forming a bottom layer by applying a first washcoat comprising one or more oxidation catalysts from either the inlet side or the outlet side over a portion, but not all, of the axial length of the substrate. This layer can optionally be dried. A second washcoat comprising at least one different oxidation catalyst is then applied from the end of the substrate that the first washcoat was not applied. In FIGS. 2 and 4, the first washcoat (Oxidation 1) was applied from the inlet sides of the substrate and then the second washcoat (Oxidation 2) was applied from the outlet of the substrate. The labels would be reversed when the first washcoat was applied from the outlet side of the substrate.

(Not shown in the figures) The bottom layer washcoat(s) can then be dried and preferably calcined. A top layer can be formed by applying a washcoat comprising one or more SCR catalysts over the bottom layer comprising the oxidation catalyst from the inlet end and from the outlet end, where the washcoats comprising the SCR catalyst have a space between them and the oxidation layer is not completely coated by the two SCR layers. The catalyst article can then be dried and calcined.

In FIGS. 2a-c, the lengths of the first oxidation catalyst layer (Oxidation 1) and the second oxidation catalyst layer (Oxidation 2) are shown as being approximately the same as each other. In some configurations, the respective length of Oxidation 1 and Oxidation 2 may be different from one another, while meeting the requirement that the oxidation layer as a whole covers the axial length of the substrate.

FIG. 3a shows a configuration in which a first top layer comprising a first SCR catalyst (SCR 1) and a second top layer comprising a second SCR catalyst (SCR 2) is located over a bottom layer comprising an oxidation catalyst, where the second top layer is located at the outlet and the first top layer is located adjacent to the second top layer on the inlet side of the second top layer, and the portion of the bottom layer extending from the inlet is not covered by a top layer. A catalytic article of this configuration can be prepared by forming a bottom layer by applying a washcoat comprising one or more oxidation catalysts over the axial length of the substrate. The washcoat can then be dried and preferably calcined. A first top layer can be formed by applying a washcoat comprising one or more SCR catalysts over a portion of the bottom layer comprising the oxidation catalyst, where the outlet of an injector device places the first washcoat at a location near the desired point on the oxidation layer where the first washcoat and the second washcoat meet. A second top layer can be formed by applying a washcoat comprising one or more SCR catalysts that are different from the SCR catalyst in the first top layer over the bottom layer comprising the oxidation catalyst from the outlet end. The catalyst article can then be dried and calcined.

FIG. 3b shows a configuration in which a first top layer comprising a first SCR catalyst (SCR 1) and a second top layer comprising a second SCR catalyst (SCR 2) is located over a bottom layer comprising an oxidation catalyst, where the first top layer is located at the inlet and the second top layer is located adjacent to the first top layer, and a portion of the bottom layer extending from the outlet is not covered by a top layer. A catalytic article of this configuration can be prepared by forming a bottom layer by applying a washcoat comprising one or more oxidation catalysts over the axial length of the substrate. The washcoat can then be dried and preferably calcined. A second top layer can be formed by applying a washcoat comprising one or more SCR catalysts over a portion of the bottom layer comprising the oxidation catalyst, where the end of an injector device places the first washcoat at a location near the desired point on the oxidation layer where the first washcoat and the second washcoat meet. A first top layer can be formed by applying a first washcoat comprising one or more SCR catalysts that are different from the SCR catalyst in the second top layer over the bottom layer comprising the oxidation catalyst from the outlet end. The catalyst article can then be dried and calcined.

In FIGS. 3a and b, the lengths of the first SCR washcoat (SCR 1) and the second SCR washcoat (SCR 2) are shown being approximately the same. In some configurations, the length of these two washcoats may be different.

FIG. 4a shows a configuration in which a first top layer comprising a first SCR catalyst (SCR 1) and a second top layer comprising a second SCR catalyst (SCR 2) is located over a bottom layer comprising a first oxidation catalyst (Oxidation 1) and a second oxidation catalyst (Oxidation 2), where the first top layer is located at the inlet over a portion of the first oxidation catalyst and the second top layer is located at the outlet over a portion of the second oxidation catalyst, and the portion of the bottom layer between the two top layers is not covered by a top layer. A catalytic article of this configuration can be prepared by forming a bottom layer by applying a first washcoat comprising one or more oxidation catalysts over a portion of the axial length of the substrate from either the inlet or the outlet, and then applying a second washcoat comprising one or more oxidation catalysts that are different than the oxidation catalyst in the first washcoat over the remaining portion of the axial length of the substrate from the end that was not used to apply the first washcoat. The washcoats can then be dried and preferably calcined. A first top layer can be formed by applying a washcoat comprising one or more SCR catalysts over a portion of one or both of the bottom layers comprising the oxidation catalyst, where the end of an injector device places the first washcoat at a location near the desired point on the oxidation layers where the first washcoat and the second washcoat meet. A second top layer can be formed by applying from the outlet end a second washcoat comprising one or more SCR catalysts that are different from the SCR catalysts in the first washcoat used in forming the top layer over at least a portion of one of the second oxidation bottom layer. The catalyst article can then be dried and calcined.

FIG. 4b shows a configuration in which a first top layer comprising a first SCR catalyst (SCR 1) and a second top layer comprising a second SCR catalyst (SCR 2) is located over a bottom layer comprising a first oxidation catalyst (Oxidation 1) and a second oxidation catalyst (Oxidation 2), where the second top layer (SCR 2) is located at the outlet end over a portion of the second oxidation catalyst and the first top layer (SCR 1) is located adjacent to the second top layer on the inlet side of the second top layer, and a portion of the bottom layer extended from the inlet is not covered by a top layer. The second SCR catalyst is shown covering portions of both the first and second oxidation layers.

In some configurations, the second SCR layer can cover a portion of just the second oxidation washcoat and the first SCR layer can cover at least all of the first oxidation layer and optionally at least a portion of the second oxidation layer.

A second top layer can be formed by applying a washcoat comprising one or more SCR catalysts over a portion of the bottom layer comprising the oxidation catalyst, where the end of an injector device places the second washcoat at a location near the desired point on the oxidation layer where the first washcoat and the second washcoat meet. A catalytic article of this configuration can be prepared by forming a bottom layer by applying a first washcoat comprising one or more oxidation catalysts over a portion of the axial length of the substrate from either the inlet or the outlet, and then applying a second washcoat comprising one or more oxidation catalysts that are different from the oxidation catalyst in the first washcoat over the remaining portion of the axial length of the substrate from the end that was not used to apply the first washcoat. The washcoats can then be dried and preferably calcined. A second top layer can be formed by applying a washcoat comprising one or more SCR catalysts over a portion of one or both of the bottom layers comprising the oxidation catalyst, where the end of an injector device places the second washcoat at a location near the desired point on the oxidation layers where the first washcoat and the second washcoat meet. A first top layer can be formed by applying from the inlet end a first washcoat comprising one or more SCR catalysts that are different from the SCR catalysts in the second washcoat used in forming the top layer over at least a portion of one of the second oxidation bottom layer. The catalyst article can then be dried and calcined.

In FIGS. 4a and b, the lengths of the first SCR catalyst layer (SCR 1) and the second SCR catalyst layer (SCR 2) are shown as being approximately the same and the lengths of the first oxidation catalyst layer (Oxidation 1) and the second oxidation catalyst layer (Oxidation 2) are shown as being approximately the same as each other, wherein collectively the lengths of the SCR washcoats are shorter than the total length of the oxidation layers, i.e. the axial length. In some configurations, the length of these SCR layers and/or the lengths of the oxidation catalyst layers may be different from one another, while the oxidation catalyst layer as a whole meets the requirement that the oxidation layer as a whole covers the axial length of the substrate.

SCR Catalyst

In various configurations, the compositions can comprise a first SCR catalyst or a first SCR catalyst and a second SCR catalyst.

The first SCR catalyst can be different from the second SCR catalyst by comprising a different active component, as described below, by having a different loading of the active component, or both.

In some configurations, the loading, e.g. expressed as grams per cubic inch or grams per liter, of the second SCR catalyst is higher than the loading of the first SCR catalyst.

The active component in the first and second SCR catalysts can be independently selected from the group consisting of a base metal, an oxide of a base metal, a mixed metal oxides, a molecular sieve, a metal exchanged molecular sieve or a mixture thereof. The base metal can be selected from the group consisting of cerium, chromium, cobalt, copper, iron, manganese, molybdenum, nickel, tungsten, vanadium and zirconium, and mixtures thereof.

SCR compositions consisting of vanadium supported on a refractory metal oxide such as alumina, silica, zirconia, titania, ceria and combinations thereof are well known and widely used commercially in mobile applications. Typical compositions are described in U.S. Pat. Nos. 4,010,238 and 4,085,193, the entire contents of which are incorporated herein by reference. Compositions used commercially, especially in mobile applications, comprise $TiO_2$ on to which $WO_3$ and $V_2O_5$ have been dispersed at concentrations ranging from 0 to 20 wt. % and 0.1 to 6 wt. %, respectively. The second SCR catalyst can comprise Nb—Ce—Zr or Nb on $MnO_2$. These catalysts may contain other inorganic materials such as $SiO_2$ and $ZrO_2$ acting as binders and promoters.

When the SCR catalyst is a base metal, the catalyst article can further comprise at least one base metal promoter. As used herein, a "promoter" is understood to mean a substance that when added into a catalyst, increases the activity of the catalyst. The base metal promoter can be in the form of a metal, an oxide of the metal, or a mixture thereof. The at least one base metal catalyst promoter may be selected from neodymium (Nd), barium (Ba), cerium (Ce), lanthanum (La), praseodymium (Pr), magnesium (Mg), calcium (Ca), manganese (Mn), zinc (Zn), niobium (Nb), zirconium (Zr), molybdenum (Mo), tin (Sn), tantalum (Ta), strontium (Sr) and oxides thereof. The at least one base metal catalyst promoter can preferably be $MnO_2$, $MnO_2O_3$, $Fe_2O_3$, $SnO_2$, CuO, CoO, $CeO_2$ and mixtures thereof.

The at least one base metal catalyst promoter may be added to the catalyst in the form of a salt in an aqueous solution, such as a nitrate or an acetate.

The at least one base metal catalyst promoter and at least one base metal catalyst, e.g., copper, may be impregnated from an aqueous solution onto the oxide support material(s), may be added into a washcoat comprising the oxide support material(s), or may be impregnated into a support previously coated with the washcoat.

The SCR catalyst can comprise a molecular sieve or a metal exchanged molecular sieve. As is used herein "molecular sieve" is understood to mean a metastable material containing tiny pores of a precise and uniform size that may be used as an adsorbent for gases or liquids. The molecules which are small enough to pass through the pores are adsorbed while the larger molecules are not. The molecular sieve can be a zeolitic molecular sieve, a non-zeolitic molecular sieve, or a mixture thereof.

The SCR catalyst can comprise a molecular sieve or a metal exchanged molecular sieve where the molecular sieve is small pore, medium pore, large pore, or a mixture thereof. A "small pore molecular sieve" is a molecular sieve containing a maximum ring size of 8 tetrahedral atoms. A "medium pore molecular sieve" is a molecular sieve containing a maximum ring size of 10 tetrahedral atoms. A "large pore molecular sieve" is a molecular sieve having a maximum ring size of 12 tetrahedral atoms.

The SCR catalysts can comprise a molecular sieve selected from the group consisting of aluminosilicate molecular sieves, metal-containing aluminosilicate molecular sieves, aluminophosphate (AlPO) molecular sieves, metal-containing aluminophosphate (MeAlPO) molecular sieves, silico-aluminophosphate (SAPO) molecular sieves, and metal containing silico-aluminophosphate (MeAPSO) molecular sieves, and mixtures thereof.

Aluminosilicate molecular sieves and metal-containing aluminosilicate molecular sieves are zeolitic molecular sieves; aluminophosphate (AlPO) molecular sieves, metal-containing aluminophosphate (MeAlPO) molecular sieves, silico-aluminophosphate (SAPO) molecular sieves, and metal containing silico-aluminophosphate (MeAPSO) molecular sieves are non-zeolitic molecular sieves.

Aluminosilicate zeolites can have a silica/alumina molar ratio (SAR), defined as $SiO_2/Al_2O_3$, from at least about 5, preferably at least about 15, with useful ranges of from about 10 to 200.

Either of the SCR catalysts can comprise a small pore molecular sieve selected from the group of Framework Types consisting of ACO, AEI, AEN, AFN, AFT, AFX, ANA, APC, APD, ATT, CDO, CHA, DDR, DFT, EAB, EDI, EPI, EM, GIS, GOO, IHW, ITE, ITW, LEV, KFI, MER, MON, NSI, OWE, PAU, PHI, RHO, RTH, SAT, SAV, SFW, SIV, THO, TSC, UEI, UFI, VNI, YUG, and ZON, and mixtures and/or intergrowths thereof. Preferably the small pore molecular sieve is selected from the group of Framework Types consisting of AEI, AFX, CHA, DDR, EM, ITE, KFI, LEV and SFW.

Either of the SCR catalysts can comprise a medium pore molecular sieve selected from the group of Framework Types consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI, and WEN, and mixtures and/or intergrowths thereof. Preferably, the medium pore molecular sieve selected from the group of Framework Types consisting of FER, MFI and STT.

Either of the SCR catalysts can comprise a large pore molecular sieve selected from the group of Framework Types consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, and VET, and mixtures and/or intergrowths thereof. Preferably, the large pore molecular sieve is selected from the group of Framework Types consisting of BEA, MOR and OFF.

Preferably the SCR catalyst comprises a molecular sieve or a metal-containing molecular sieve and the molecular sieve or the molecular sieve in the metal-containing molecular sieve comprises a Framework Type selected from the group consisting of: AEI, BEA (beta zeolite), CHA (Chabazite), FAU (zeolite Y), FER (ferrierite), MFI (ZSM-5) and MOR (mordenite).

A metal exchanged molecular sieve can have at least one metal from one of the groups VB, VIB, VIIB, VIIIB, IB, or IIB of the periodic table deposited onto extra-framework sites on the external surface or within the channels, cavities, or cages of the molecular sieves. Preferably the metal is selected from the group consisting of cerium, chromium, cobalt, copper, gallium, indium, iridium, iron, manganese, molybdenum, nickel, palladium, platinum, ruthenium, rhenium, silver, tin and zinc. More preferably, the metal in the metal-containing molecular sieve comprises copper or iron.

The metal may be in one of several forms, including, but not limited to, zero valent metal atoms or clusters, isolated cations, mononuclear or polynuclear oxycations, or as extended metal oxides. Preferably, the metals can be iron, copper, and mixtures or combinations thereof.

The metal can be combined with the molecular sieve using a mixture or a solution of the metal precursor in a suitable solvent. The term "metal precursor" means any compound or complex that can be dispersed on the zeolite to give a catalytically-active metal component. This invention is not restricted to metal precursors of a particular type, composition, or purity. Preferably the solvent is water due to both economics and environmental aspects of using other solvents.

When copper, a preferred metal, is used, suitable complexes or compounds include, but are not limited to, anhydrous and hydrated copper sulphate, copper nitrate, copper acetate, copper acetylacetonate, copper oxide, copper hydroxide, and salts of copper amines (e.g. $[Cu(NH_3)_4]^{2+}$).

The molecular sieve can be added to the solution of the metal component to form a suspension, which is then allowed to react so that the metal component is distributed on the zeolite. The metal can be distributed in the pore channels as well as on the outer surface of the molecular sieve. The metal can be distributed in ionic form or as a metal oxide. For example, copper may be distributed as copper (II) ions, copper (I) ions, or as copper oxide. The molecular sieve containing the metal can be separated from the liquid phase of the suspension, washed, and dried. The resulting metal-containing molecular sieve can then be calcined to fix the metal in the molecular sieve. Preferably, the SCR catalyst comprises a Cu-SCR, an Fe-SCR, vanadium, a mixed oxide, promoted Ce—Zr or promoted $MnO_2$. A Cu-SCR catalyst comprises copper and a molecular sieve and an Fe-SCR catalyst comprises iron and a molecular sieve.

A metal exchanged molecular sieve can contain in the range of about 0.10% to about 10% by weight of a group VB, VIB, VIIB, VIIIB, IB, or IIB metal located on extra framework sites on the external surface or within the channels, cavities, or cages of the molecular sieve. Preferably, the extra framework metal can be present in an amount of in the range of about 0.2% to about 5% by weight.

The metal exchanged molecular sieve is preferably a copper (Cu) or iron (Fe) supported molecular sieve having from about 0.1 wt. % to about 20.0 wt. % copper or iron of the total weight of the catalyst. More preferably copper or iron is present from about 0.5 wt. % to about 15 wt. % of the total weight of the catalyst. Most preferably copper or iron is present from about 1 wt. % to about 9 wt. % of the total weight of the catalyst.

The metal supported on a mixed oxide can comprise a catalytic composition containing at least one catalytic component consisting of (i) at least one transition metal dispersed on a mixed oxide or composite oxide or a mixture thereof as support material consisting of cerium and zirconium; or (ii) cerium oxide and zirconium oxide as single oxides or a composite oxide thereof or a mixture of the single oxides and the composite oxide dispersed on an inert oxide support material, where at least one transition metal is dispersed thereon, and the at least one transition metal is selected from the group consisting of a Group VIB metal, a Group IB metal, a Group IVA metal, a Group VB metal, a Group VIM metal, a Group VIII metal and mixtures of any two or more thereof, provided that at least one selected transition metal is tungsten, and the content of cerium and zirconium as oxides in the catalytic component is $Ce_xZr_{1-x}O_2$, where X=0.1-0.5.

The SCR catalyst can be present in the SCR layer in an amount from 0.5 g/in$^3$ to 3.0 g/in$^3$, preferably from 1.0 g/in$^3$ to 2.5 g/in$^3$, more preferably from 1.25 g/in$^3$ to 2.0 g/in$^3$. The oxidation catalyst can be present in the oxidation layer from 0.2 g/in$^3$ to 1.6 g/in$^3$, preferably from 0.35 g/in$^3$ to 1.25 g/in$^3$, more preferably from 0.5 g/in$^3$ to 1.0 g/in$^3$.

Oxidation Catalyst

The oxidation catalyst can comprise a noble metal or mixtures thereof. Preferably, the noble metal is gold, silver, platinum, palladium, ruthenium or rhodium, or combinations thereof. More preferably the noble metal is platinum or palladium or a combination of platinum and palladium.

The platinum group metal can be present in an amount from about 0.1 g/ft$^3$ to about 75 g/ft$^3$, preferably from about 2 g/ft$^3$ to about 50 g/ft$^3$, more preferably from about 5 g/ft$^3$ to about 30 g/ft$^3$.

The noble metals are preferably disposed on a refractory metal oxide support.

The ammonia oxidation catalyst can comprise platinum, palladium or a combination of platinum and palladium on a support with low ammonia storage. The term "a support with low ammonia storage" means a support that stores less than 0.001 mmol $NH_3$ per m$^3$ of support. The support with low ammonia storage is preferably a molecular sieve or zeolite having a framework type selected from the group consisting of AEI, ANA, ATS, BEA, CDO, CFI, CHA, CON, DDR, ERI, FAU, FER, GON, IFR, IFW, IFY, IHW, IMF, IRN, IRY, ISV, ITE, ITG, ITN, ITR, ITW, IWR, IWS, IWV, IWW, JOZ, LTA, LTF, MEL, MEP, MFI, MRE, MSE, MTF, MTN, MTT, MTW, MVY, MWW, NON, NSI, RRO, RSN, RTE, RTH, RUT, RWR, SEW, SFE, SFF, SFG, SFH, SFN, SFS, SFV, SGT, SOD, SSF, SSO, SSY, STF, STO, STT, SVR, SVV, TON, TUN, UOS, UOV, UTL, UWY, VET, VNI. More preferably, the support with low ammonia storage is a molecular sieve or zeolite having a framework type selected from the group consisting of BEA, CDO, CON, FAU, MEL, MFI and MWW, even more preferably the framework type is selected from the group consisting of BEA and MFI.

The support with low ammonia storage can be a siliceous support. The siliceous support can comprise a silica or a zeolite with a silica-to-alumina ratio of at least one of: (a) at least 100, (b) at least 200, (c) at least 250, (d) at least 300, (e) at least 400, (f) at least 500, (g) at least 750 and (h) at least 1000.

The siliceous support can comprise a molecular sieve having a BEA, CDO, CON, FAU, MEL, MFI or MWW Framework Type, preferably a BEA or MFI Framework Type.

The ratio of the amount of the SCR catalyst to the amount of platinum on a support with low ammonia storage in the blend can be in the range of 0.1 to 300:1, inclusive, preferably from 3:1 to 300:1, inclusive, more preferably 7:1 to 100:1, inclusive, even more preferably in the range of 10:1 to 50:1, inclusive, based on the weight of these components.

The term "active component loading" refers to the weight of the support of platinum+the weight of platinum+the weight of the first SCR catalyst in the blend. Platinum can be present in the catalyst in an active component loading from about 0.01 to about 0.3 wt. %, inclusive, preferably, from about 0.03-0.2 wt. %, inclusive, more preferably from about 0.05-0.17 wt. %, inclusive, most preferably, from about 0.07-0.15 wt. %, inclusive.

Platinum can be present in the oxidation layer at from about 0.1 wt. % to 2 wt. %, inclusive, preferably from 0.1 to 1 wt. %, inclusive, more preferably from 0.1 wt. % to 0.5 wt. %, inclusive, relative to the weight of the layer.

Additional catalysts such as palladium (Pd), gold (Au) silver (Ag), ruthenium (Ru) or rhodium (Rh) can be present with Pt, preferably in a blend with Pt.

The oxidation layer can further comprise an SCR catalyst where the oxidation catalyst and the SCR catalyst in the oxidation layer are present as a blend.

A washcoat comprising the SCR catalyst or the oxidation catalyst is preferably a solution, suspension, or slurry that provides a surface coating. The top layer containing the SCR catalyst can contain the SCR catalyst in an amount of about 80% or greater based on the weight of the layer. The remainder comprises binders, etc. The noble metal coating preferably contains about 0.05-5 weight percent noble metal based on the weight of the refractory metal oxide support.

A washcoat can also include non-catalytic components, such as fillers, binders, stabilizers, rheology modifiers, and other additives, including one or more of alumina, silica, non-zeolite silica alumina, titania, zirconia, ceria.

A slurry can comprise a pore-forming agent, such as graphite, cellulose, starch, polyacrylate, and polyethylene, and the like. These additional components do not necessarily catalyse the desired reaction, but instead improve the catalytic material's effectiveness, for example by increasing its operating temperature range, increasing contact surface area of the catalyst, increasing adherence of the catalyst to a substrate, etc.

The bottom layer coating is preferably applied to the substrate in an amount sufficient to produce a washcoat loading of about 0.1-40 g/ft$^3$ of noble metal, more preferably about 0.5-20 g/ft$^3$, and even more preferably about 1-10 g/ft$^3$.

The top layer coating can be applied over the bottom layer to produce an SCR catalyst washcoat loading >0.25 g/in$^3$, such as >0.50 g/in$^3$, or >0.80 g/in$^3$, e.g. 0.80 to 3.00 g/in$^3$. In preferred embodiments, the washcoat loading is >1.00 g/in$^3$, such as >1.2 g/in$^3$, >1.5 g/in$^3$, >1.7 g/in$^3$ or >2.00 g/in$^3$ or for example 1.5 to 2.5 g/in$^3$.

Substrates used in the present invention are preferably composed of ceramic, ceramic-like materials or of refractory metals. Examples of ceramic or ceramic-like materials include cordierite, α-alumina, silicon carbide, silicon nitride, zirconia, mullite, spodumene, alumina-silica-magnesia or zirconium silicate. Examples of refractory metals include stainless steel.

Two substrate designs that can be used in combustion turbines are honeycombs and plates. Preferred honeycomb substrates include flow-through monoliths having a so-called honeycomb geometry that comprise multiple adjacent, parallel channels that are open at both ends and generally extend from the inlet face to the outlet face of the substrate and result in a high-surface area-to-volume ratio. The honeycomb structures can be made of extruded ceramic material, such as cordierite, or corrugated metal foil, such a stainless steel. In addition to cordierite, silicon carbide, silicon nitride, ceramic, and metal, other materials that can be used in the substrate include aluminium nitride, silicon nitride, aluminium titanate, α-alumina, mullite e.g. acicular mullite, pollucite, a thermet such as Al$_2$OsZFe, Al$_2$O$_3$/Ni or B$_4$CZFe, or composites comprising segments of any two or more thereof. Preferred materials include cordierite, silicon carbide, and alumina titanate. For combustion turbine applications, the honeycomb flow-through monolith preferably has a low cell density of about 50 to about 400 cells per square inch (cpsi), more preferably about 50 to about 250 cells per square inch.

The catalytic article having the SCR layer extending from the outlet end toward the inlet end can provide more sulphur tolerance and/or greater CO/HC conversion than a comparable article where the second catalyst coating completely overlaps the first catalyst coating.

The catalytic article having the SCR layer extending from the outlet end toward the inlet end can provide higher CO/HC conversion than a comparable article where the second catalyst coating completely overlaps the first catalyst coating.

The catalytic article having the SCR layer extending from the outlet end toward the inlet end can provide reduced ammonia slip higher CO/HC conversion than a comparable article where the second catalyst coating completely overlaps the first catalyst coating.

The catalytic article having the SCR layer extending from a distance from the inlet end of the substrate towards the outlet end of the substrate, where the SCR layer does not cover the inlet and outlet portions of the substrate, can provide more sulphur tolerance than a comparable article where the second catalyst coating completely overlaps the first catalyst coating.

Plate-type catalysts have lower pressure drops and are less susceptible to plugging and fouling than the honeycomb types. Honeycomb configurations are smaller than plate types, but have higher pressure drops and plug more easily. The plate substrate can be constructed of metal, such as stainless steel. The plate substrate is preferably a corrugated metal and preferably comprises a plurality of holes or openings thought the substrate.

An exhaust system comprises an SCR catalyst and a catalytic article according to the first aspect of the invention.

A combustion turbine comprises an exhaust system according to the invention.

A method of increasing the conversion of CO and HC in an exhaust gas from a combustion turbine comprises contacting an exhaust gas comprising CO and HC with a catalytic article according to the first aspect of the invention.

A method of reducing ammonia slip in an exhaust gas from a combustion turbine comprises contacting an exhaust gas comprising ammonia with a catalytic article according to the first aspect of the invention.

A method of increasing the conversion of CO and HC and reducing ammonia slip in an exhaust gas from a combustion turbine comprises contacting an exhaust gas comprising CO, HC and ammonia with a catalytic article according to the first aspect of the invention.

A method of increasing the sulphur tolerance of a catalyst in an exhaust gas from a combustion turbine comprises contacting an exhaust gas comprising sulphur with a catalytic article of the first aspect of the invention, wherein the SCR layer extends from the outlet end toward the inlet end Catalytic articles described herein can be used to increase the sulphur tolerance of a catalyst in an exhaust gas from a combustion turbine by contacting an exhaust gas comprising sulphur with the catalytic article.

Catalytic articles described herein can be used to reduce the deactivation of a catalyst due to the presence of sulphur by contacting an exhaust gas comprising sulphur with the catalytic article.

The invention can also be defined according to one or more of the following definitions:

1) A catalytic article comprising: (a) a substrate having an inlet end and an outlet end defining an axial length; (b) an oxidation layer comprising an oxidation catalyst comprising one or more noble metals, the oxidation layer being positioned on the substrate and covering the axial length of the substrate; and (c) an SCR layer comprising an SCR catalyst, the SCR layer being positioned on the oxidation zone and overlapping a portion of the oxidation layer, where the portion is less than 100%, where the article is configured for treating an exhaust gas stream containing one or more of NOx, hydrocarbons, CO, SOx and ammonia from a combustion turbine.

2) The catalytic article according to 1), where the SCR layer extends from the inlet end toward the outlet end.

3) The catalytic article according to 1), where the SCR layer extends from the outlet end toward the inlet end.

4) The catalytic article according to 1), where the SCR layer extends from the inlet end toward the outlet end and from the outlet end towards the inlet end.

5) The catalytic article according to any one 1) to 5) inclusive, where the SCR layer comprises a first SCR catalyst and a second SCR catalyst where the first SCR catalyst is different than the second SCR catalyst and the first SCR catalyst is located on the inlet side of the article relative to the second SCR catalyst.

6) The catalytic article according to 5), where the first SCR catalyst and the second SCR catalyst differ based on the loading of the SCR catalyst.

7) The catalytic article according to 5) or 6), where the loading of the second SCR catalyst is higher than in the first SCR.

8) The catalytic article according to 5), 6) or 7), where the first SCR catalyst and the second SCR catalyst comprise different catalytic species.

9) The catalytic article according to any one of 1) to 8) inclusive, where the oxidation layer comprises a first oxidation catalyst and a second oxidation catalyst where the first oxidation catalyst is different than the second oxidation catalyst and the first oxidation catalyst is located on the inlet side of the article relative to the second oxidation catalyst.

10) The catalytic article according to any one of 1) to 9) inclusive, where the first oxidation catalyst and the second oxidation catalyst differ based on the loading of the oxidation catalyst.

11) The catalytic article according to any one of 1) to 10), where the loading of the oxidation catalyst is higher in the second oxidation catalyst than in the first oxidation catalyst.

12) The catalytic article according to any one of 1) to 11), where the first oxidation catalyst and the second oxidation catalyst comprise different catalytic species.

13) The catalytic article according to any one of 2) to 12) inclusive, further comprising a third catalyst coating, where the third catalyst coating extends from the outlet end toward the inlet end and the first catalyst coating contains an area that is not coated by the second catalyst coating or the third catalyst coating.

14) The catalytic article according to 13), where the third catalyst coating comprises an SCR catalyst that is different than the SCR catalyst in the second catalyst coating.

15) The catalytic article according to any one of 1) to 14) inclusive, where the SCR zone covers 90% or less of the axial length of the substrate.

16) The catalytic article according to any one of 1) to 15) inclusive, where the SCR zone extends 75% or less of the axial length of the substrate.

17) The catalytic article according to any one of 1) to 16) inclusive, where the SCR zone extends 55% or less of the axial length of the substrate.

18) The catalytic article according to any one of 1) to 17) inclusive, where the oxidation catalyst comprises a platinum group metal.

19) The catalytic article according to any one of 1) to 18), where the platinum group metal is platinum or palladium or ruthenium or a mixture thereof.

20) The catalytic article according to any one of 1) to 19), where the oxidation catalyst comprises platinum on a support with low ammonia storage.

21) The catalyst article according to 20), where the support with low ammonia storage is a siliceous support.

22) The catalyst article according to 21), where the siliceous support comprises a silica or a zeolite with silica-to-alumina ratio of at least one of: (a) ≥100, (b) ≥200, (c) ≥250, ≥300, (d) ≥400, (e) ≥500, (f) ≥750 and (g) ≥1000.

23) The catalyst article according to 21) or 22), wherein the siliceous support comprises BEA or MFI.

24) The catalytic article according to any one of 1) to 23) inclusive, where the oxidation layer further comprises an SCR catalyst and the oxidation catalyst and the SCR catalyst in the oxidation layer are present as a blend.

25) The catalytic article according to any one of 1) to 24), where the article provides higher CO/HC conversion than a comparable article where the second catalyst coating completely overlaps the first catalyst coating.

26) The catalytic article according to any one of 1) to 25) inclusive, where the article provides reduced ammonia slip than a comparable article where the second catalyst coating completely overlaps the first catalyst coating.

27) The catalytic article according to any one of 1) to 26) inclusive, where the article provides higher CO/HC conversion and reduced ammonia slip than a comparable article where the second catalyst coating completely overlaps the first catalyst coating.

28) The catalytic article according to any one of 1) to 27) inclusive, where the one or more noble metals are disposed on a refractory metal oxide support.

29) The catalytic article according to any one of 1) to 28) inclusive, where the SCR catalyst comprises a base metal, an oxide of a base metal, a molecular sieve, a metal-containing molecular sieve, a metal supported on a mixed oxide or a mixture thereof.

30) The catalytic article according to 29), where the base metal is selected from the group consisting of cerium, chromium, cobalt, copper, iron, manganese, molybdenum, nickel, tungsten, and vanadium, and mixtures thereof.

31) The catalytic article according to 29), where the SCR catalyst comprises a metal-containing molecular sieve where the metal is selected from the group consisting of cerium, chromium, cobalt, copper, gallium, indium, iridium, iron, manganese, molybdenum, nickel, palladium, platinum, ruthenium, rhenium, silver, tin and zinc.

32) The catalytic article according to 31), where the metal in the metal-containing molecular sieve comprises copper or iron.

33) The catalytic article according to any one of 1) to 30) inclusive, 31) and 32), where the SCR catalyst comprises an aluminosilicate molecular sieve, an aluminophosphate molecular sieve, a silicoaluminophosphate molecular sieve, a metal-containing aluminosilicate molecular sieve, a metal-containing aluminophosphate molecular sieve, or a metal-containing silicoaluminophosphate molecular sieve.

34) The catalytic article according to any one of 1) to 30) inclusive and 31) to 33) inclusive, where the SCR catalyst comprises a molecular sieve or a metal-containing molecular sieve and the molecular sieve or the molecular sieve in the metal-containing molecular sieve comprises a Framework Type selected from the group consisting of: AEI, BEA (beta zeolite), CHA (Chabazite), FAU (zeolite Y), FER (ferrierite), MFI (ZSM-5) and MOR (mordenite).

35) The catalyst article according to 29), where the metal supported on a mixed oxide comprises a catalytic composition containing at least one catalytic component consisting of (i) at least one transition metal dispersed on a mixed oxide or composite oxide or a mixture thereof as support material consisting of cerium and zirconium; or (ii) cerium oxide and zirconium oxide as single oxides or a composite oxide thereof or a mixture of the single oxides and the composite oxide dispersed on an inert oxide support material, where at least one transition metal is dispersed thereon, and the at least one transition metal is selected from the group consisting of a Group VIB metal, a Group IB metal, a Group IVA metal, a Group VB metal, a Group VIM metal, a Group VIII metal and mixtures of any two or more thereof, provided that at least one selected transition metal is tungsten, and the content of cerium and zirconium as oxides in the catalytic component is $Ce_xZr_{1-x}O_2$, where X=0.1-0.5.

36) The catalyst article according to any one of 1) to 35) inclusive, where the SCR catalyst is present in the SCR layer in an amount from 0.5 $g/in^3$ to 3.0 $g/in^3$, preferably from 1.0 $g/in^3$ to 2.5 $g/in^3$, more preferably from 1.25 $g/in^3$ to 2.05 $g/in^3$.

37) The catalytic article according to any one of 1) to 36) inclusive, where the oxidation catalyst is present in the oxidation layer from 0.2 $g/in^3$ to 1.6 $g/in^3$, preferably from SCR layer ranges from 0.35 $g/in^3$ to 1.25 $g/in^3$, more preferably from 0.5 $g/in^3$ to 1.0 $g/in^3$.

38) The catalytic article according to any one of 1) to 37) inclusive, where the substrate comprises cordierite, silicon carbide, alumina titanate or a metal.

39) An exhaust system comprising a catalyst article of any one of 1) to 38) inclusive.

40) A method of increasing the conversion of CO and HC in an exhaust gas from a combustion turbine, the method comprising contacting an exhaust gas comprising CO and HC with a catalytic article according to any one of 1) to 37) inclusive.

41) A method of reducing ammonia slip in an exhaust gas from a combustion turbine, the method comprising contacting an exhaust gas comprising ammonia with a catalytic article according to any one of 1) to 37) inclusive.

42) A method of increasing the conversion of CO and HC and reducing ammonia slip in an exhaust gas from a combustion turbine, the method comprising contacting an exhaust gas comprising CO, HC and ammonia with a catalytic article according to any one of 1 to 37 inclusive.

In order that the invention may be more fully understood, the following Examples are provided by way of illustration only.

EXAMPLES

Example 1

An extruded SCR catalyst was prepared containing titania, tungstena, vanadia, and appropriate binders. The SCR catalyst cell density was 140 cells per square inch (cpsi).

Example 2 (Comparative)

A dual layered Ammonia Slip Catalyst (ASC) was prepared on a ceramic 230 cpsi substrate. A first layer was coated having a continuous alumina washcoated layer along the entire length of the substrate. Pt was then impregnated into the washcoated alumina layer from a platinum nitrate solution to a loading of 5 $g/ft^3$ Pt. A second washcoat containing Cu impregnated CHA zeolite mixed with binders was applied in a continuous layer covering 100% of Pt alumina layer.

Example 3

A zoned ASC/Oxidation Catalyst (OC) was prepared on a ceramic 230 cpsi substrate. A first layer was coated having a continuous alumina washcoated layer along the entire length of the substrate. Pt was then impregnated into the washcoated alumina layer from a platinum nitrate solution to a loading of 5 $g/ft^3$ Pt. A second washcoat containing Cu impregnated CHA zeolite mixed with binders was applied in a continuous layer covering the front 85% of Pt alumina layer.

Example 4

A zoned ASC/OC was prepared on a ceramic 230 cpsi substrate. A first layer was coated having a continuous alumina washcoated layer along the entire length of the substrate. Pt was then impregnated into the washcoated alumina layer from a platinum nitrate solution to a loading of 5 $g/ft^3$ Pt. A second washcoat containing Cu impregnated CHA zeolite mixed with binders was applied in a continuous layer covering the front 70% of Pt alumina layer.

Sample Testing

The catalysts of Examples 1-4 inclusive were tested in various combinations in a laboratory scale reactor. The gas composition fed to the catalyst was 50 ppm CO, 24 ppm NO, 6 ppm $NO_2$, 30 pm $NH_3$, 15% $O_2$, 8% water, 3% $CO_2$, and balanced by $N_2$. CO, NOx, and $NH_3$ conversions were measured with the reactor held at steady state temperature points ranging from 200 to 450° C.

Example 5

Example 1 and Example 2 were inserted into the reactor in series (SCR catalyst of Example 1 upstream of the ASC of Comparative Example 2) and tested according to the procedures described above with a flow rate such that the Gas Hourly Space Velocity (GHSV) over the entire SCR+ASC volume was 80,000 $hr^{-1}$.

| 100% of Pt Alumina Layer Covered | | | |
|---|---|---|---|
| Inlet Temperature | Conversion (%) | | Outlet $NH_3$ Concentration |
| (° C.) | $NO_x$ | CO | (ppm) |
| 200 | 58 | 23 | 12.0 |
| 300 | 88 | 48 | 4.2 |
| 400 | 77 | 62 | 3.5 |
| 450 | 55 | 70 | 3.6 |

Example 5 shows that the ASC of Comparative Example 2 can provide at least 55% and 20% conversion of NOx and CO, respectively, at 200° C., at least 85% and 45% conversion at 300° C., at least 75% and 60% conversion at 400° C. and at least 50% and 65% conversion at 450° C.

These concentrations represent reductions in $NH_3$ concentrations of 60%, 86%, 89% and 88% at 200, 300, 400 and 450° C., respective, from the initial concentration of $NH_3$.

Example 6

Example 1 and Example 3 were inserted into the reactor in series (SCR catalyst of Example 1 upstream of the ASC of Example 3) and tested according to the procedures described hereinabove with a flow rate such that the GHSV over the SCR+ASC portion of the Zoned ASC/OC catalyst was 80,000 $hr^{-1}$ and the GHSV over the OC portion of the zoned ASC/OC was 1,040,115 $hr^{-1}$.

| Front 85% of Pt Alumina Layer Covered | | | |
|---|---|---|---|
| Inlet Temperature | Conversion (%) | | Outlet $NH_3$ Concentration |
| (° C.) | $NO_x$ | CO | (ppm) |
| 200 | 62 | 43 | 8.5 |
| 300 | 85 | 69 | 2.3 |
| 400 | 76 | 77 | 2.4 |
| 450 | 52 | 83 | 2.5 |

Example 6 shows that the ASC of Example 3 as ASC can provide at least 60% and 40% conversion of NOx and CO, respectively, at 200° C., at least 80% and 65% conversion at 300° C., at least 75% and 75% conversion at 400° C. and at least 50% and 80% conversion at 450° C.

These concentrations represent reductions in $NH_3$ concentrations of 71%, 92%, 92% and 91% at 200, 300, 400 and 450° C., respective, from the initial concentration of $NH_3$.

Example 7

Example 1 and Example 4 were inserted into the reactor in series (SCR catalyst of Example 1 upstream of the ASC of Example 4) and tested according to the procedures described hereinabove with a flow rate such that the GHSV over the SCR+ASC portion of the Zoned ASC/OC catalyst was 80,000 $hr^{-1}$ and the GHSV over the OC portion of the zoned ASC/OC was 480 $Khr^{-1}$.

| Front 70% of Pt Alumina Layer Covered | | | |
|---|---|---|---|
| Inlet Temperature | Conversion (%) | | Outlet $NH_3$ Concentration |
| (° C.) | $NO_x$ | CO | (ppm) |
| 200 | 59 | 43 | 10.0 |
| 300 | 83 | 71 | 2.2 |
| 400 | 74 | 77 | 2.3 |
| 450 | 50 | 82 | 2.4 |

Example 6 shows that the ASC of Example 4 as ASC can provide at least 55% and 40% conversion of NOx and CO, respectively, at 200° C., at least 80% and 70% conversion at 300° C., at least 70% and 75% conversion at 400° C. and at least 50% and 80% conversion at 450° C.

These concentrations represent reductions in $NH_3$ concentrations of 66%, 93%, 92% and 91% at 200, 300, 400 and 450° C., respective, from the initial concentration of $NH_3$.

Although the invention is illustrated and described herein with reference to specific embodiments, the invention is not intended to be limited to the details shown. Rather, various modifications may be made in the details within the scope and range of equivalents of the claims and without departing from the invention.

The invention claimed is:

1. A catalytic article for treating an exhaust gas stream from a combustion turbine, comprising:
    (a) a substrate having an inlet end and an outlet end defining an axial length;
    (b) an oxidation layer comprising an oxidation catalyst comprising one or more noble metals, the oxidation layer being positioned on the substrate and covering the axial length of the substrate; and
    (c) an SCR layer comprising an SCR catalyst, the SCR layer being positioned on the oxidation layer and overlapping a portion of the oxidation layer, wherein the portion is less than 100%,
    wherein the article is configured for treating an exhaust gas stream containing one or more of NOx, hydrocarbons, CO, SOx and ammonia from a combustion turbine.

2. The catalytic article of claim 1, wherein the SCR layer comprises a first SCR catalyst and a second SCR catalyst wherein the first SCR catalyst is different than the second SCR catalyst and the first SCR catalyst is located on an inlet side of the article relative to the second SCR catalyst.

3. The catalytic article of claim 2, wherein the first SCR catalyst and the second SCR catalyst differ based on SCR catalyst loading.

4. The catalytic article of claim 2, wherein a loading of the second SCR catalyst is higher than in the first SCR catalyst.

5. The catalytic article of claim 1, wherein the oxidation layer comprises a first oxidation catalyst and a second oxidation catalyst wherein the first oxidation catalyst is different than the second oxidation catalyst and the first oxidation catalyst is located on an inlet side of the article relative to the second oxidation catalyst.

6. The catalytic article of claim 1, further comprising a third catalyst coating, wherein the third catalyst coating extends from the outlet end toward the inlet end and the oxidation layer comprises an area that is not coated by the SCR layer or the third catalyst coating.

7. The catalytic article of claim 1, wherein the SCR layer covers 90% or less of the axial length of the substrate.

8. The catalytic article of claim 1, wherein the oxidation catalyst comprises a platinum group metal.

9. The catalytic article of claim 1, wherein the oxidation catalyst comprises platinum on a support with low ammonia storage.

10. The catalytic article of claim 1, wherein the oxidation layer further comprises an SCR catalyst, and the oxidation catalyst and the SCR catalyst in the oxidation layer are present as a blend.

11. The catalytic article of claim 1, wherein the article provides higher CO/HC conversion and reduced ammonia slip than a comparable article wherein the SCR layer completely overlaps the oxidation layer.

12. The catalytic article of claim 1, wherein the one or more noble metals are disposed on a refractory metal oxide support.

13. The catalytic article of claim 12, wherein the SCR catalyst comprises a molecular sieve or a metal-containing molecular sieve and the molecular sieve or the molecular sieve in the metal-containing molecular sieve comprises a Framework Type selected from the group consisting of: AEI, BEA (beta zeolite), CHA (Chabazite), FAU (zeolite Y), FER (ferrierite), MFI (ZSM-5) and MOR (mordenite).

14. The catalyst article of claim 12, wherein the metal supported on a mixed oxide comprises a catalytic composition containing at least one catalytic component consisting of (i) at least one transition metal dispersed on a mixed oxide or composite oxide or a mixture thereof as support material consisting of cerium and zirconium; or (ii) cerium oxide and zirconium oxide as single oxides or a composite oxide thereof or a mixture of the single oxides and the composite oxide dispersed on an inert oxide support material, wherein at least one transition metal is dispersed thereon, and the at least one transition metal is selected from the group consisting of a Group VIB metal, a Group IB metal, a Group IVA metal, a Group VB metal, a Group VIIB metal, a Group VIII metal and mixtures of any two or more thereof, provided that at least one selected transition metal is tungsten, and the content of cerium and zirconium as oxides in the catalytic component is $Ce_xZr_{1-x}O_2$, wherein X–0.1-0.5.

15. The catalytic article of claim 1, wherein the SCR catalyst comprises a base metal, an oxide of a base metal, a molecular sieve, a metal-containing molecular sieve, a metal supported on a mixed oxide, or a mixture thereof.

16. The catalytic article of claim 15, wherein the base metal is selected from the group consisting of cerium, chromium, cobalt, copper, iron, manganese, molybdenum, nickel, tungsten, and vanadium, and mixtures thereof.

17. The catalytic article of claim 15, wherein the SCR catalyst comprises a metal-containing molecular sieve wherein the metal is selected from the group consisting of cerium, chromium, cobalt, copper, gallium, indium, iridium, iron, manganese, molybdenum, nickel, palladium, platinum, ruthenium, rhenium, silver, tin and zinc.

18. The catalytic article of claim 1, wherein the SCR catalyst comprises an aluminosilicate molecular sieve, an aluminophosphate molecular sieve, a silicoaluminophosphate molecular sieve, a metal-containing aluminosilicate molecular sieve, a metal-containing aluminophosphate molecular sieve, or a metal-containing silicoaluminophosphate molecular sieve.

19. A method of increasing the conversion of CO and HC in an exhaust gas from a combustion turbine, the method comprising contacting an exhaust gas comprising CO and HC with a catalytic article of claim 1.

20. A method of reducing ammonia slip in an exhaust gas from a combustion turbine, the method comprising contacting an exhaust gas comprising ammonia with a catalytic article of claim 1.

* * * * *